US012286215B2

(12) United States Patent
Vincekovic et al.

(10) Patent No.: US 12,286,215 B2
(45) Date of Patent: Apr. 29, 2025

(54) AIRCRAFT HAVING RETRACTABLE VORTEX GENERATORS

(71) Applicant: BLUE SPIRIT AERO SAS, Rueil-Malmaison (FR)

(72) Inventors: David Vincekovic, Woodville (AU); Florian Pasquiet, Rochefort du Gard (FR); Olivier Savin, Rueil-Malmaison (FR)

(73) Assignee: BLUE SPIRIT AERO SAS, Rueil-Malmaison (FR)

( * ) Notice: Subject to any disclaimer, the term of this patent is extended or adjusted under 35 U.S.C. 154(b) by 1 day.

(21) Appl. No.: 18/262,269

(22) PCT Filed: Jan. 20, 2022

(86) PCT No.: PCT/EP2022/051230
§ 371 (c)(1),
(2) Date: Jul. 20, 2023

(87) PCT Pub. No.: WO2022/157243
PCT Pub. Date: Jul. 28, 2022

(65) Prior Publication Data
US 2024/0076035 A1 Mar. 7, 2024

(30) Foreign Application Priority Data

Jan. 22, 2021 (EP) .................................... 21153046
May 10, 2021 (EP) .................................... 21173058

(51) Int. Cl.
*B64C 23/06* (2006.01)
*B64C 9/34* (2006.01)
*B64C 5/12* (2006.01)

(52) U.S. Cl.
CPC ................ *B64C 23/06* (2013.01); *B64C 9/34* (2013.01); *B64C 5/12* (2013.01)

(58) Field of Classification Search
CPC .............. B64C 23/06; B64C 5/12; B64C 9/34
See application file for complete search history.

(56) References Cited

U.S. PATENT DOCUMENTS

| 3,262,945 | A | 7/1966 | Schroeder |
| 3,960,345 | A | 6/1976 | Lippert, Jr. |
| 4,039,161 | A | 8/1977 | Bauer |
| 5,253,828 | A | 10/1993 | Cox |
| 6,837,465 | B2 | 1/2005 | Lisy et al. |
| 8,657,238 | B2 | 2/2014 | Fox et al. |
| 10,137,979 | B1 | 11/2018 | Prince et al. |
| 10,202,187 | B2 | 2/2019 | Hegenbart et al. |

(Continued)

FOREIGN PATENT DOCUMENTS

DE 102015120958 A1 6/2017
EP 1896323 B1 3/2008

*Primary Examiner* — Rodney A Bonnette
(74) *Attorney, Agent, or Firm* — FISHERBROYLES, LLP; Roger L. Browdy; Ronni S. Jillions

(57) ABSTRACT

A fixed-wing aircraft at least includes at least one vortex generator movable through an outer surface of the aircraft between a retracted state and a fully extended state by at least one electric motor, the at least one electric motor being exclusively adapted to actuate this at least one vortex generator, and including an electronic control unit adapted to control operation of the at least one electric motor for actuation of the at least one vortex generator.

15 Claims, 5 Drawing Sheets

(56) References Cited

U.S. PATENT DOCUMENTS

| | | | |
|---|---|---|---|
| 2004/0018086 A1* | 1/2004 | Borchers | G10K 11/175 |
| | | | 415/119 |
| 2004/0129838 A1 | 7/2004 | Lisy et al. | |
| 2007/0018056 A1 | 1/2007 | Narramore | |
| 2010/0038492 A1 | 2/2010 | Sclafani | |
| 2013/0299643 A1 | 11/2013 | Dorsett | |
| 2020/0001973 A1* | 1/2020 | Bushmire | B64C 29/0033 |
| 2020/0369364 A1* | 11/2020 | Dodt | B64C 9/36 |
| 2020/0369365 A1* | 11/2020 | Vijgen | B64C 7/02 |
| 2020/0369367 A1* | 11/2020 | Philipp | B64C 9/36 |
| 2020/0369398 A1* | 11/2020 | Philipp | B64C 5/06 |
| 2020/0391854 A1 | 12/2020 | Arana Hidalgo | |
| 2021/0261245 A1* | 8/2021 | Tao | B64C 39/08 |
| 2022/0063792 A1* | 3/2022 | Freely | B64C 11/30 |

\* cited by examiner

AIRCRAFT HAVING RETRACTABLE VORTEX GENERATORS

The invention relates to a fixed-wing aircraft that comprises at least one vortex generator movable through an outer surface of the aircraft between a retracted state and a fully extended state and an electronic control unit adapted to control actuation of the at least one vortex generator. The invention also relates to a method for operating a fixed-wing aircraft comprising at least one vortex generator movable between a retracted state and a fully extended state. The invention is particularly useful for fixed-wing propeller aircraft, in particular aircraft comprising at least three propeller propulsion units per wing, in particular having electric propulsion units.

EP 1 896 323 B1 discloses a flow control device comprising: a flow control surface over which fluid is designed to flow in a predetermined direction; vortex generators associated with the flow control surface, each respective vortex generator having a pivot axis that forms an acute angle with respect to the predetermined direction and capable of being positioned in both of an extended state, in which the respective vortex generators function to create a swirling fluid flow, and a retracted state, in which the respective vortex generators are pivoted via the pivot axis so as to lie on top of and in a parallel direction to the overlying flow control surface, and an actuator associated with each of the respective vortex generators, each actuator adapted to state the associated vortex generator between the extended and retracted states.

U.S. Pat. No. 3,263,945 discloses an aircraft wing comprising a main section and a drooping nose section having a pivotal mounting on the main section, said main section and nose section having respective upper surfaces which possess a substantially continuous common chord line when said sections are in a first positional relationship, said nose section pivoting on said pivotal mounting relative to said main section to a second positional relationship in which said upper surfaces are separated by a gap, at least one sealing plate pivotally mounted on said main section and lying in a retracted state wholly inward of said upper surfaces when said main and nose sections are in said first positional relationship, means moving said sealing plate into said gap to close it when said main and nose sections are brought into said second positional relationship, and a series of blades upstanding on said sealing plate and constituting vortex generators, said blades lying retracted wholly inward of said upper surfaces of said main and nose sections when said sections are in said first positional relationship, and projecting out above said upper surfaces when said sections are in said second positional relationship and the sealing plate is in the gap.

U.S. Pat. No. 4,039,161 discloses vortex generators connected to a control surface in front of the hinge line of the control surface so that when the control surface is deflected, the vortex generators project into the airstream on the opposite side from the deflecting control surface. The action of the vortex generators causes the airflow to remain attached to the control surface at higher angles of attack than would otherwise be possible thus increasing the lift of the air foil and control surface.

U.S. Pat. No. 5,253,828 discloses a concealable flap actuated vortex generator for generating a vortex on a lifting surface assembly, and an improved aircraft flight-lifting surface having such concealable flap actuated vortex generators. When the flap of the lifting surface assembly is in the nominal (non-extended or non-deflected) state, the vortex generator is unexposed. When the flap is actuated by a flap actuator, the flap is extended or deflected from the nominal state, thereby projecting or exposing the vortex generator into an operational state and enabling the generation of a vortex.

U.S. Pat. No. 8,657,238 B2 discloses a device and methods for low-speed performance improvement of a lifting surface assembly are disclosed. At least one vortex generator is coupled to the lifting surface assembly, and the vortex generator is extended through the lifting surface assembly by drooping a hinged leading coupled to the lifting surface assembly to increase lift. The vortex generator is retracted inside the lifting surface assembly to decrease drag.

U.S. Pat. No. 10,202,187 B2 discloses a vortex generator arrangement for an aircraft including a surface section, a flap element pivotable between a first state and a second state, a biasing arrangement biasing the flap element towards the second state, retaining devices retaining the flap element in the first or second state, and a release device releasing the flap element from the first retaining device. The biasing arrangement, the first retaining device and the second retaining device are configured such that the second retaining device automatically retains the flap element in the second state after the flap element has been pivoted by the biasing arrangement from the first state into the second state. As soon as the torque exceeds a predetermined value, the second retaining device automatically releases the flap element, which pivots against the force of the biasing arrangement into the first state and is automatically retained therein by the first retaining device.

US 2013/0299643 A1 discloses a vortex generation apparatus including a vortex generator that deploys in response to deployment of a wing leading edge lift augmentation device. The vortex generator deploys into a state to generate vortices over a main wing body upper surface region trailing the vortex generator.

US 2020/0391854 A1 discloses a retractable vortex generator system for an aircraft. The system comprises a skin, a slot arranged on the skin, a plate comprising a contour configured for energizing the boundary layer of an air current, and driving means configured for rotating the plate between a first and a second position. In the first position at least part of the contour of the plate protrudes through the slot, and in the second position the plate is retracted within the slot.

US 2010/0038492 A1 discloses a retractable chine assembly that includes at least one chine which is hingebly mountable to a surface such as of an aircraft having a wing. The chine is preferably configured to be movable between stowed and deployed positions. The aircraft may include an engine nacelle which may be mounted on an underside of the wing. The nacelle may generate a nacelle wake that passes over the wing upper surface at high angles of attack and induces flow separation. The chine is preferably configured such that a vortex generated thereby interacts which the nacelle wake to delay flow separation and stall.

US 2004/0129838 A1 discloses a flow control device and more particularly to reactive modular flow control device with deployable flow effectors. It further relates to a method of operating the flow control device. One embodiment includes a method of controlling air flow across a surface of an aircraft under certain flight conditions comprising the steps of sensing fluid separation from the surface by measuring the pressure on the surface; determining a standard deviation of the pressure measurements over a period of time; and deploying a flow effector in response to the standard deviation of the pressure measurements exceeding a predetermined threshold number.

U.S. Pat. No. 10,137,979 B1 discloses a forebody flow control system and more particularly an aircraft or missile flow control system for enhanced manoeuvrability and stabilization at high angles of attack. It further relates to a method of operating the flow control system. In one embodiment, it includes a missile or aircraft comprising an afterbody and a forebody; at least one deployable flow effector on the missile or aircraft forebody; at least one sensors each having a signal associated therewith, the at least one sensor being used for determining or estimating flow separation or side forces on the missile forebody; and a closed loop control system; wherein the closed loop control system is used for activating and deactivating the at least one deployable flow effector based on at least in part the signal of the at least one sensor.

U.S. Pat. No. 3,960,345 discloses a strake, or strakes, or faired simulation of same, mounted on a typical engine nacelle or similar wing mounted body to reduce or prevent the formation of vortices usually occurring with nacelle-wing combinations to improve the lift and drag characteristics of the combination and improve the stability of the aircraft since the undesirable variations of downwash changes over the tail surfaces are reduced or eliminated.

DE 10 2015 120 958 A1 discloses an actuator module for the controllable generation of turbulence by positioning turbulence surfaces along a surface element has an elongate module base plate and a plurality of two-dimensionally shaped bending actuators. Each of the bending actuators comprises a fibre composite panel with shape memory conductors integrated into the fibre composite. The fibre composite panel is attached to the module base plate on one attachment side, and the shape memory conductors are designed in such a way that the fibre composite panel extends in the inactive state of the shape memory conductors along the surface of the module base plate and in the active state, starting from the attachment side, curves away from the surface of the module base plate. Furthermore, the actuator module includes an arrangement of supply lines extending along the module base plate for electrically activating the bending actuators.

It is the object of the present invention to at least partially overcome the problems associated with the prior art. It is a particular object of the present invention to achieve an effective and flexible manner to delay local flow separation and aerodynamic stalling of the airflow over regions of risk on the outer surfaces of a fixed-wing aircraft while maintaining smoother air flow during flight modes when flow separation is not an issue, which reduces energy consumption.

The object is achieved according to the features of the independent claims. Advantageous embodiments can be found, e.g., in the dependent claims and/or in the description.

The object is achieved by fixed-wing aircraft, at least comprising at least one vortex generator movable through an outer surface of the aircraft between a retracted state and a fully extended state by at least one electric motor, this at least one electric motor being exclusively adapted to actuate this at least one vortex generator, and comprising an electronic control unit adapted to control operation of the electric motor for direct actuation of the at least one vortex generator.

This aircraft has the advantage that the airflow over a fixed-wing aircraft's outer surface, in particular lifting surface, can be influenced in a particularly flexible manner, thus allowing for a greater degree of flow control. When the vortex generators are actuated individually (i.e., independently from other vortex generators) and/or in groups, they can be actuated/moved to a desired deployment state (e.g., retracted, partially extended, or fully extended state, as detailed further below) specifically suited to their local position during the aircraft's current aerodynamic condition while other vortex generators at other positions can be deployed differently. This gives an effective delay of local flow separation and aerodynamic stalling at positions with vortex generators in their extended state while at other positions comprising at least partially retracted vortex generators, air can flow uninhibited thus reducing aerodynamic drag and saving energy. Energy is also saved because the vortex generators are retracted through the surface into the aircraft instead of being in a parallel, overlying relation with a flow control surface.

The aircraft may, e.g., be a passenger aircraft and/or a cargo aircraft. The aircraft may comprise at least one fixed left wing and at least one fixed right wing. The aircraft may in particular not be a helicopter.

In its fully extended state, the at least one vortex generator is maximally extended through the aircraft's surface, thus creating the strongest swirling or turbulence within the air flow. In its retracted state, the at least one vortex generator does in particular not extend from the surface but is retracted into or behind the surface. In an embodiment, the retracted vortex generator lays flush with the surface. However, it is generally possible that the vortex generator in its retracted state extends somewhat over the surface, but less than in an extended state.

In an embodiment, the at least one vortex generator may be actuated to at least one intermediate state between the fully extended state and the retracted state, i.e., to at least one partially extended state. Such a partially extended state may be, e.g., a deployment state in which the vortex generator is extended or deployed X % of the fully extended state with X=]0; 100[ (with X=0% being the fully retracted state and X=100% being the fully extended state). In an embodiment, the partially extended states may be steps of the fully extended state, e.g., 20%, 40%, 60%, 80%. In an embodiment, the partially extended states may be controlled continuously or quasi-continuously, e.g., in steps of 1% of the fully extended state. This ability may also be expressed such that the vortex generator is differentially extendable.

The extended state may also be called a deployed state. The retracted state may also be called a stowed state.

The electric motor may be, but is not limited to, a brushless direct current electric (BLDC) motor or a stepper motor. The electric motor may be connected to an electrochemical converter (ECC) that generates electrical energy from hydrogen. The electric motor may be connected to the electrochemical converter directly or via an electric storage like a battery. The electrochemical converter may be connected to a hydrogen tank for supply of hydrogen. The electric motor may be directly linked to at least one vortex generator or may be linked via, e.g., a linkage system, a gear system, a vertical lifting device, etc. For example, the electrochemical converter may be or comprise at least one fuel cell.

The electronic control unit is adapted to control operation of an electric motor and thus the actuation of at least one vortex generator driven or actuated by this electric motor. That an electric motor is exclusively used or adapted to actuate at least one vortex generator comprises that the motor is not adapted to actuate a flow control surface of another type (i.e. not a vortex generator) such as a leading or trailing edge control surface like a flap, an aileron etc. Thus, the vortex generators may be actuated independently from an actuation or movement of a flow control surface of another type, if so desired.

It is an embodiment that at least one vortex generator of the aircraft is exclusively actuated by operation of an electric motor while at least one other vortex generator of the aircraft is actuated together with a flow control surface. It is thus possible that a subgroup of vortex generators is movable independently from an actuation of a flow control surface of another type while another subgroup of vortex generators is only movable together with an actuation or movement of a flow control surface, e.g. because the movements are mechanically coupled/linked to each other, e.g., because a subgroup of vortex generators and at least one control surface are actuated by the same electric motor or mechanically by the pilot.

It is also possible to actuate at least one vortex generator that is actuatable independently from a control surface of another type in unison with a control surface of another type, if the electronic control unit operates its electric motor accordingly. However, this coordinated movement is not compulsory but selectively chosen by the electronic control unit and may be, e.g., dependent on the operating modes or control laws.

At least one vortex generator may, e.g., be positioned on either side of a lifting surface (e.g., wings/tails), primary and secondary control surfaces (e.g., ailerons/rudders/elevators/flaps), fuselage and/or propulsion system (e.g., pod/engine fairing).

As indicated above, it is an embodiment that the aircraft comprises multiple vortex generators and at least one vortex generator out of these multiple vortex generators is individually actuatable, i.e., extendable and retractable. This advantageously enables a particularly flexible manner to actuate the vortex generators and allows for a greater degree of flow control than existing solutions in prior art. In one variant, all vortex generators are individually actuatable to have an increased control of the flow over the surface featuring these vortex generators. To be individually actuatable, a vortex generator may be associated with a respective electric motor.

It is an embodiment that the aircraft comprises multiple vortex generators and at least one set or subgroup comprising at least two vortex generators each out of these multiple vortex generators is actuatable or movable in a similar manner, e.g., as a group. In this case, the vortex generators of a group may be actuatable by a common motor. Of course, individually actuatable vortex generators may also be actuated such that they move in a synchronized or group-like manner.

The individual and/or group-wise actuation of vortex generators includes that, if not actuated, at least two the vortex generators may be in a different deployment state, e.g., retracted, partially extended (to different degrees), or fully extended. Moreover, vortex generators within the same subgroup may be extended to different deployment states using a linkage system.

It is an embodiment that the aircraft comprises multiple vortex generators on each lifting surface, in particular on an upper side or surface of a wing. It is an embodiment that the vortex generators of one wing are actuatable independently from the vortex generators of the other wing. This is particularly advantageous when the airflow conditions are different for the different wing, e.g., during a rolling manoeuvre of the aircraft and/or in the presence of shear winds.

These vortex generators on each lifting surface may be actuated individually, in particular such that at least two vortex generators of one lifting surface are actuatable independently from each other. Alternatively or additionally, the vortex generators of each lifting surface may be actuated in subgroups. These embodiments are particularly useful when the airflow over the same wing may be significantly different with respect to the position of the vortex generators. This may especially be the case when the wing is equipped with propellers/propeller propulsion units. Alternatively or additionally, all vortex generators of a wing may be actuated in a similar manner, if so desired, e.g., may all be extended or retracted at the same time.

The propellers of the propeller propulsion units may be driven by an electrically powered propulsion means (e.g., an electric propulsion motor/electrically powered engine) and/or by a fuel powered propulsion means (e.g., a fuel powered engine like a turboprop aircraft/turbine engine, a piston engine, etc.)

It is an embodiment that multiple propeller propulsion units are attached at each wing and sets/subgroups comprising of at least one vortex generator each are positioned on the wings behind at least two propellers, i.e., at least one set or subgroup comprising at least one vortex generator positioned behind a first propeller and another set or subgroup comprising at least one vortex generator positioned behind a second propeller of the same wing. In particular, a set of at least one vortex generator is positioned behind each of the propellers of the propeller propulsion units. This embodiment gives the advantage that these vortex generators are positioned within a propeller wash (also called "propeller slipstream"), and their deployment state thus has a particularly large effect on the air flow.

A propeller propulsion unit may comprise at least one propeller and at least one motor, in particular electric motor, to drive the at least one propeller. The propeller propulsion unit may further comprise or be connected to an electrochemical converter, ECC, that generates electric energy from hydrogen. The propeller propulsion unit may further comprise a hydrogen tank fluidically connected to at least one electrochemical converter. It is thus an embodiment that the aircraft is a hydrogen fueled, electrically driven aircraft.

In an embodiment, at least one propeller propulsion unit comprises two propellers, e.g., one propeller in front of the wing and one propeller behind/aft the wing or two counter-rotating propellers in front of the wing. In any case, each propeller propulsion unit in particular only creates one propeller slipstream area at the wing.

The propeller propulsion unit may in particular be mounted to a lower side of a wing, an upper side of a wing or to the tip of the wing.

It is an embodiment that the vortex generators of these sets are selectively actuatable between sets, i.e. that vortex generators of one set are actuatable or movable differently from vortex generators of another set. That the vortex generators of these sets are selectively actuatable between sets may also be described such that the vortex generators of a set located in a given propeller slipstream are actuatable or movable differently from other sets located in different propeller slipstreams. This gives the advantage that the deployment state of the vortex generators can be matched with characteristics of the individual propeller propulsion units, e.g., their throttle setting or rotation rate (RPM), which may differ between the propeller propulsion units.

It is an embodiment that the alignment of at least one vortex generator of at least one set of vortex generators positioned behind a propeller propulsion unit (and thus within a propeller slipstream volume of that propeller propulsion unit) is offset (e.g., angled) with respect to the flow direction of a propeller slipstream generated by the propeller/propeller propulsion unit in front. This gives the advantage that such a vortex generator may redirect part of the propeller slipstream onto areas of the wing next to a propeller, i.e., to an area not lying in a propeller slipstream/outside of a propeller slipstream, e.g., to an area between two neighbouring propeller propulsion units/propeller slipstreams.

It is an embodiment that at least one set comprising at least one vortex generator is positioned on the wings laterally offset/next to the propeller propulsion units and the propellers, respectively, (e.g., in an area not lying in a propeller slipstream) wherein the vortex generators of these sets are actuatable differently to the sets of vortex generators positioned behind the propellers. This embodiment gives the advantage that the airflow over the wing may be controlled in a particularly precise manner. In particular, the deployment of vortex generators that are positioned outside of the propeller slipstream can increase the turbulence/turbidity of the flow to delay the flow separation over regions without the increased dynamic pressure from the propeller slipstream.

In particular, the aircraft may be a distributed electric propulsion (DEP) aircraft in the sense that each wing comprises at least three electrically driven propeller propulsion units per wing, in particular at least three hydrogen fueled, electrically driven propulsion units. The flexible (individual and/or group-wise) actuation of the vortex generators is especially useful for this case since the airflow over the wings is particularly irregular along the wing, e.g. as compared to a conventional aircraft having two or less propellers/propeller slipstream areas per wing.

It is an embodiment that the actuation of at least one vortex generator is dependent on a flight mode/phase or flight manoeuvre, e.g., whether the aircraft is taking off, climbing, cruising, descending, turning and/or landing.

It is an embodiment that the actuation of at least one vortex generator is dependent on the aircraft velocity. This gives the advantage that local flow separation and aerodynamic stalling of the airflow may be delayed at low speeds while excess energy consumption due to aerodynamic drag is reduced at high speeds.

It is an embodiment that the actuation of at least one vortex generator is dependent on the aircraft roll angle and/or roll velocity. For example, the vortex generators of a wing moving downwards may be actuated differently from the vortex generators of a wing moving upwards. One use case is to increase the control authority of a wingtip control surface (e.g., aileron) during a roll manoeuvre, as one wingtip experiences an increase in angle of attack while the other wingtip experiences a decrease in angle of attack depending on whether the vehicle is ascending or descending.

It is an embodiment that the actuation of at least one vortex generator is dependent on the sideslip angle of the aircraft. Sideslip is the directional angle of the aircraft and occurs when an aircraft is moving sideways as well as forward relative to the oncoming airflow. One use case is if a large sideslip angle is detected by onboard sensors, at least one vortex generator may be deployed to increase the directional (yaw) stability and delay the critical angle of directional instability. At best, past this critical angle, the workload for the pilot to control the aircraft significantly increases and at worst the pilot will lose control.

It is an embodiment that the actuation of at least one vortex generator is dependent on the angle of attack of the aircraft. Angle of attack is the angle between the oncoming airflow and a reference line through the aircraft. As the angle of attack increases, the air flow is more likely to separate from the lifting surfaces, potentially leading to stalling. One use case is that if a large angle of attack is detected by onboard sensors, at least one vortex generator may be deployed to re-energise the flow/keep it attached and delay stall.

It is an embodiment that the actuation of at least one vortex generator is dependent on at least one operation parameter of at least one propeller propulsion unit. This may include the failure of a propeller propulsion unit. One use case is to deploy at least one vortex generator to reduce the stall risk of a region over the wing that is located aft of a failed propeller propulsion unit.

It is an embodiment that the at least one operation parameter comprises at least one operation parameter out of the following group of operation parameters:
 a throttle setting;
 a propeller rotation rate (RPM);
 a propeller rotation direction;
 a propeller blade pitch angle; and/or
 an input power supplied to a propeller propulsion unit.

This also includes the case where the propulsion unit is idle and/or the propeller blades are feathered in the event that the propulsion unit fails. Feathering may mean to set the pitch angle of the propeller blades close to 90 degrees, such that they are close to being parallel with the airflow to minimise drag and prevent unwanted propeller rotation (which is known as windmilling).

The input power supplied to the propeller propulsion unit particularly comprises input power supplied to a motor/engine which drives the propeller.

That the actuation of at least one vortex generator is dependent on the propeller rotation direction of at least one propeller propulsion unit, may, for example, include the case that if one propeller is rotating counterclockwise, as viewed from behind the propeller, then a vortex generator located near the boundary of the propeller slipstream (but still within the slipstream) where the blade is moving upwards relative to the wing surface can be actuated differently to a vortex generator near the boundary of the propeller slipstream where the blade is moving downwards relative to the wing surface. Then, the actuation of at least one vortex generator is particularly dependent on the relative movement direction of the blades in front of it (e.g., up, down, sideways relative to the vortex generator).

This gives the advantage of greater flow control across the wing, and principally it increases the control of swirl recovery. Swirl recovery is the reduction in rotational induced velocities from the propeller with the purpose to reduce the induced loses of the propeller. The swirl distribution is dependent on the propeller rotation direction and through actuating individual vortex generators differently within the propeller slipstream in relation to the propeller rotation direction, the swirl distribution may be controlled. This is particularly useful in the case where the propeller rotation direction is different between adjacent propeller propulsion units.

It is an embodiment that the actuation of at least one vortex generator is dependent on the degree of deflection (e.g., a degree of rotation and/or extension) of a control surface, e.g., a flap, an aileron, a rudder, etc. The degree of deflection may be detected by a sensor connected to the electronic control unit or may be known from the commands to move the control surface.

It is an embodiment that the electronic control unit is connected to at least one sensor and is adapted to operate at least one electric motor for actuation of at least one vortex generator based on sensor readings of the at least one sensor. The at least one sensor may be a gyroscope, e.g., to measure the roll and yaw angles or a pitot static probe to determine the aircraft air speed etc.

It is an embodiment that the actuation of at least one vortex generator is dependent on a control command from a pilot or from the flight computer. This gives the advantage that a pilot or the flight computer may override the automatic control of the electronic control unit depending on the flight phase/maneuverer or operating mode. The pilot may have the ability to select the operating mode of the vortex generators from within the cockpit.

In an embodiment, the actuation may be governed by an actuation logic or actuation scheme in which at least some, possibly all, of the parameter are assigned a unique weight and/or hierarchy determining its influence on the actuation of at least one vortex generator, possibly on the actuation of at least one subgroup or all vortex generators.

However, actuation of the at least one of the vortex generator is not limited to or restricted by these parameters. For example, the actuation may also be dependent on their position on the aircraft surface: for example, a subgroup of vortex generators near the wingtip may have a higher sensitivity to the roll angle than a subgroup of vortex generators a near the fuselage.

The object is also achieved by a method for operating a fixed-wing aircraft comprising at least one vortex generator directly movable between a retracted state and an extended state by at least one electric motor, wherein the electric motor is controlled for selective actuation of at least one vortex generator. The method may be embodied in analogy to the aircraft and gives the same advantages.

The above-described features and advantages of the invention as well as their implementation will now be schematically described in more detail by at least one embodiment in the context of one or more figures.

Figure 1:
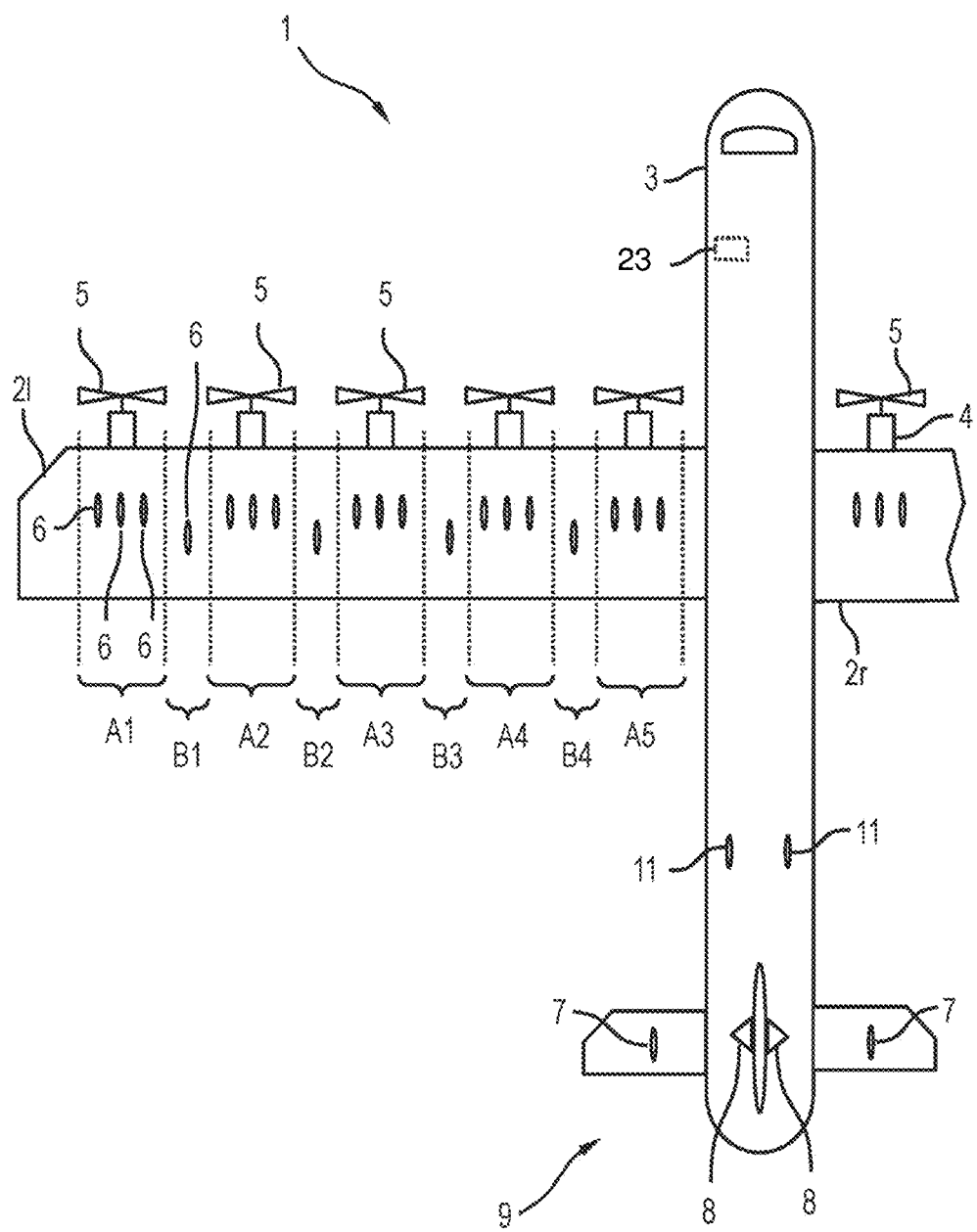
FIG. 1 shows a sketch of an aircraft in a top-down view according to a first embodiment.

FIG. 1 shows a sketch of an aircraft 1 having a left wing 2l and a right wing 2r (partially shown) fixed to a fuselage 3. Each of the wings 2l, 2r is equipped with multiple propeller propulsion units 4 each comprising a propeller 5 on its front. Each wing 2l, 2r is further equipped with selectively extendable and retractable vortex generators 6, in particular at different positions along the wings 2l, 2r (not shown for right wing 2r). In particular, the left wing 2l and the right wing 2r and in particular the vortex generators 6 and their positions may be mirror symmetric with respect to the wings 2l, 2r.

As shown by example of the left wing 2l, some of the vortex generators 6 may be positioned in areas A1 to A5 of the upper surface of the wing 2l behind respective propellers 5 thus being exposed to the respective propeller slipstreams. Other vortex generators 6 may be positioned in areas B1 to B4 next to the propellers 5, here: in areas B1 to B4 between the propellers 5.

The aircraft 1 also comprises one or more other selectively extendable and retractable vortex generators, e.g., vortex generators on the underside of the wings 2l, 2r (not shown), vortex generators 7 and 8 at a tail 9 of the aircraft, vortex generators 11 at the fuselage 3 or a fairing, vortex generators at the propeller propulsion units 4 (not shown), etc.

In one embodiment, all vortex generators 6 of the left wing 2l and the right wing 2r are individually movable through the upper surface of the respective wing 2l, 2r (i.e., through a respective opening) between a retracted state and a fully extended state, possibly including intermediate I partially extended states. The actuation of the vortex generators 6 is caused by operation of respective electric motors 12 (see FIG. 2 and FIG. 3) adapted to exclusively actuate the vortex generators 6. Operation of the electric motors 12 is controlled by an electric control unit 23 of the aircraft 1.

Alternatively, at least one set or subgroup comprising at least two vortex generators 6 is actuatable in a similar manner. For example, the sets of vortex generators 6 in each of the areas A1 to A5 may be actuated in a similar manner/group-wise, wherein the actuation may differ over different sets and areas A1 to A5, respectively. In one embodiment, the vortex generators 6 for each of the areas A1 to A5 may be actuated together by the same electric motor 12, e.g., the vortex generators 6 of area A1 by a certain common electric motor, the vortex generators 6 of area A2 by another electric motor 12, etc.

Also, vortex generators 6 of areas B1 to B4 may be actuatable in the same manner or in a different manner as compared to vortex generators 6 of areas A1 to A5 and/or as compared to vortex generators 6 of other areas B1 to B4.

In one embodiment, at least one of the vortex generators 6 of the areas A1 to A5 is angled with respect to the direction of the propeller slipstream, so that part of this airflow is partially redirected to an area B1 to B4.

Generally, the vortex generators 6 of one wing 2l, 2r may be actuatable independently from the vortex generators 6 of the other wing 2r, 2l so that the vortex generators 6 of area A1 of left wing 2l and the vortex generators 6 of mirror symmetric area A1 of right wing 2r may be extended in different degrees at the same time, for example, or the vortex generators 6 of area A1 of left wing 2l may be retracted while the vortex generators 6 of area A1 of right wing 2r are at least partially extended, etc.

Figure 2:
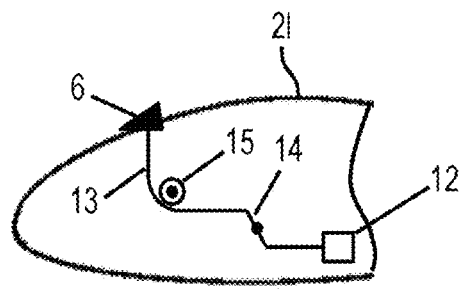
FIG. 2 shows a cross-sectional side view of a sketch of a wing with an extended vortex generator.

FIG. 2 shows a cross-sectional side view of a sketch of the wing 2*l* with an extended vortex generator 6. The vortex generator 6 is mechanically linked to an electric motor 12 by a cable 13, in the present example via a lift enhancer in form of a lever 14 and a barrel 15, alternatively via a linkage (not shown). The extended state may be the "normal" state that the vortex generator 6 will move to without external force. This may be achieved by springs etc. (not shown). The electric motor 12 only actuates at least one vortex generator 6.

Figure 3:
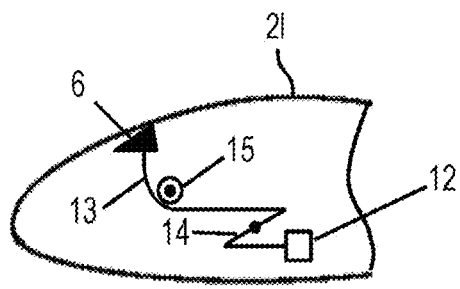
FIG. 3 shows a cross-sectional side view of a sketch of the wing of FIG. 2 with a retracted vortex generator.

FIG. 3 shows a cross-sectional side view of a sketch of the wing 2*l* with a retracted vortex generator 6. To actuate the vortex generator 6 into its retracted state, the electric motor 12 moves the lever 14 which, in turn, pulls the cable 13 that, in turn, pulls the vortex generator 6 into the wing 2*l*. The retracted vortex generator 6 may be flush with the surrounding surface of the wing 2*l* or may still protrude from the surrounding surface, but less than if in a fully extended state.

The vortex generators 6 shown in FIG. 2 and FIG. 3 are actuatable independently from the movement and/or positional state of other flow control surfaces 16 or 17 (see FIG. 4 to FIG. 6), e.g. leading and/or trailing edge control surfaces, e.g. slats, flaps, ailerons, etc.

Figure 4:
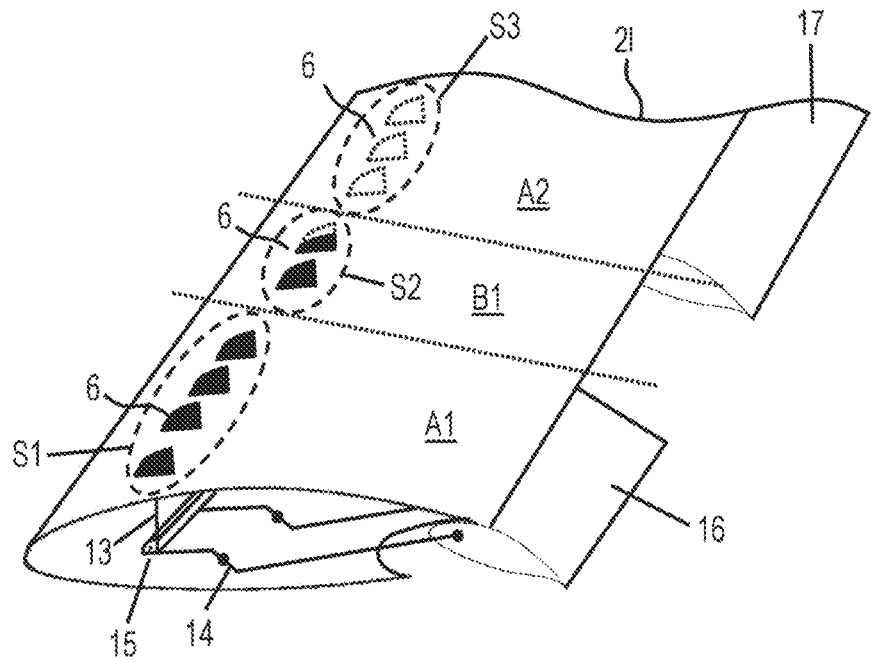
FIG. 4 shows an oblique view of a wing section with two sets of extended vortex generators and one set of retracted vortex generators.

In one exemplary embodiment, one or some (but not all) vortex generators 6 of the wings 2*l*, 2*r* are actuated together with a flow control surface: FIG. 4 shows an oblique view of a section of wing 2*l* with three sets of vortex generators 6, namely a first set S1 of four vortex generators 6 positioned in an area A1 behind a propeller 5, a second set S2 of two vortex generators 6 positioned in an area B1 between two propellers 5, and a third set S3 of three vortex generators 6 in an area A2 behind a propeller 5. Just as an exemplary embodiment, the vortex generators 6 of each set S1, S2, and S3, respectively, may be actuatable or movable in the same manner.

As shown, the vortex generators 6 of set S1 are mechanically linked and thus actuate together with respective trailing edge control surface (e.g., aileron) 16.

In one embodiment, the vortex generators 6 of set S3 are mechanically linked and thus actuate together with respective trailing edge control surface 17.

In another embodiment, the vortex generators 6 of set S3 are not mechanically linked with trailing edge control surface (e.g., aileron) 17, and thus do not necessarily (but may) be actuated in combination with the respective control surface 17, e.g. in the manner shown in FIG. 2 and FIG. 3, wherein the vortex generators 6 of sets S1 and S3 are moved by actuation of dedicated electric motors 12 dependent on the position (extension/angle of rotation) of the trailing edge control surfaces 16 and 17 as sensed or detected by at least one sensor (not shown) or based on control commands for the trailing edge control surfaces 16 and 17.

Figure 5:
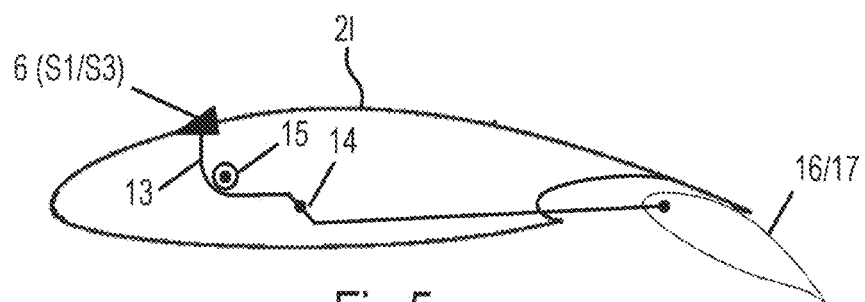
FIG. 5 shows a cross-sectional side view of a wing with a vortex generator extended together with a trailing edge control surface.
Figure 6:
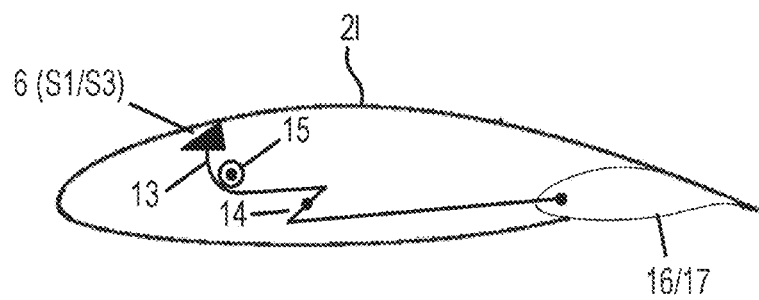
FIG. 6 shows a cross-sectional side view of the wing of FIG. 5 with a vortex generator retracted together with the trailing edge control surface.

In yet another embodiment (not shown), the vortex generators 6 of sets S1 and S3 are not mechanically linked with respective trailing edge control surface 16 and 17, respectively. This gives the advantage that the vortex generators 6 of sets S1 and S3 may be movable in analogy to the mechanical linkage as shown in FIG. 4 to FIG. 6 but may also be actuated independently from the trailing edge control surfaces 16 and 17. In this case the vortex generators 6 of sets S1 and S3 may be actuated by different electric motors than the trailing edge control surfaces 16 and 17.

In any case, when the trailing edge control surfaces 16 and 17 are deflected through different degrees of deflection (e.g., by different angles), the vortex generators 6 of the respective sets S1 and/or S3 may also be extended to different states.

Referring back to FIG. 4, the vortex generators 6 of set S2 may be independently actuatable from the trailing edge control surfaces 16 and 17 and may, e.g., be differentially extended independent of the extension of retraction of the vortex generators 6 of the sets S1 and S3 (as shown), or may also be fully extended or fully retracted, e.g., depending on the aircraft's 1 manoeuvre.

As also shown in FIG. 5, when the trailing edge control surfaces 16 and 17 are moved out of the wing 2*l*, the vortex generators 6 may be extended. This is particularly suitable for low-speed scenarios such as take-off and landing, where local flow separation and aerodynamic stall that may occur over the lifting upper surface of the wing 2*l* is delayed for greater angles of attack. By doing so, the stall speed of the aircraft 1 will be decreased thereby improving the low-speed performance characteristics of the aircraft 1. This offers a simpler, lighter, and smoother leading-edge solution when compared to heavier and more complex leading edge high lift devices such as slats or slots that also introduce surface discontinuities.

During a cruising phase, the trailing edge control surfaces 16 and 17 are moved into the wing 2*l*, and the vortex generators 6 are retracted, as shown in FIG. 6. The wing surfaces will thus feature smooth low drag flow without the disturbance of deployed vortex generators 6 which would have otherwise transitioned the flow to turbulence. For the general cruise case, it is undesirable to force the transition of flow to turbulence as the aircraft 1 is not operating at high angles of attack where flow separation is an issue. Thus, energy is saved.

Figure 7:
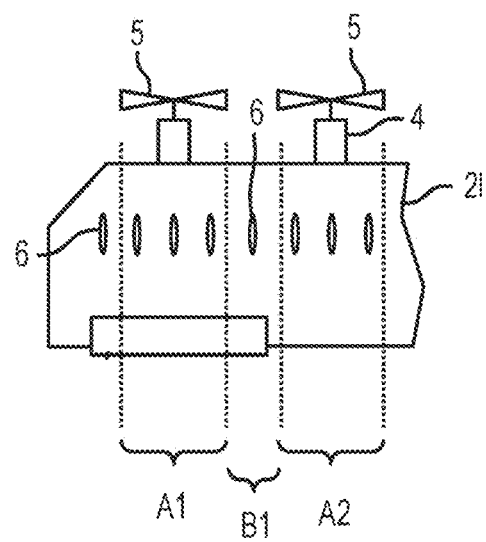
FIG. 7 shows a sketch of a section of an aircraft's left wing in a top-down view according to a second embodiment.

FIG. 7 shows a top-down view of a section of a left wing 2*l* of the aircraft 1 according to a second exemplary embodiment with areas A1, A2, and B1. In this embodiment, a control surface in form, e.g., an aileron 16 or 17 is shown. Also, one of the vortex generators 6 is shown to be positioned next to the area A1 near the wingtip.

If the control surface (e.g., aileron) 16 or 17 is deflected, the vortex generators 6 in front of it are also extended. These vortex generators 6 may be extended dependent on the deflection of the aileron 16 or 17, but not mechanically linked to the aileron 16, 17, e.g., as described in conjunction with FIG. 2 and FIG. 3. Alternatively, these vortex generators 6 may be mechanically linked to the aileron 16, 17, e.g., as described in conjunction with FIG. 4 to FIG. 6.

Figure 8:
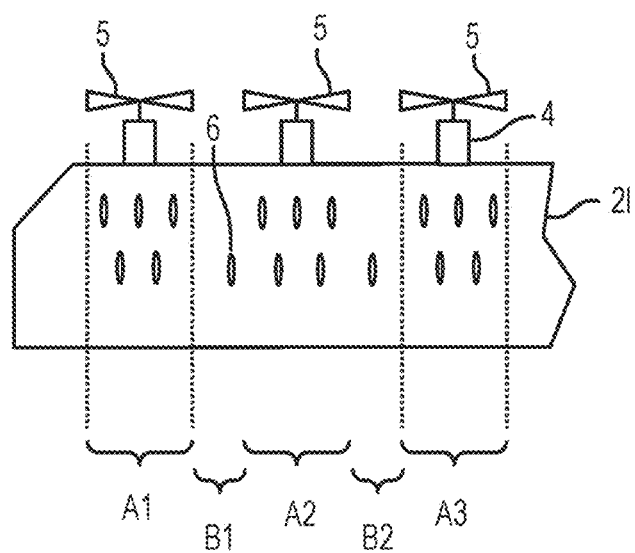
FIG. 8 shows in a top-down view a sketch of a section of an aircraft's left wing in a top-down view according to a third embodiment.

FIG. 8 shows a top-down view of a section of a left wing 2*l* of the aircraft 1 according to a third embodiment with areas A1 to A3, and B1 to B2. In this embodiment, there are two rows of vortex generators 6 positioned behind each other at least in the areas A1 to A3.

In this scenario, the propeller 5 or propeller propulsion unit 4 associated with area A2 has failed. Thus, the vortex generators 6 of area A2, and possibly also the vortex generators 6 of areas B1 and/or B2 are extended to control the air flow in this area(s) in order to delay the onset of flow separation. The other vortex generators 6, e.g., of areas A1 and A3, remain in their deployment state, e.g. a retracted state.

Figure 9:
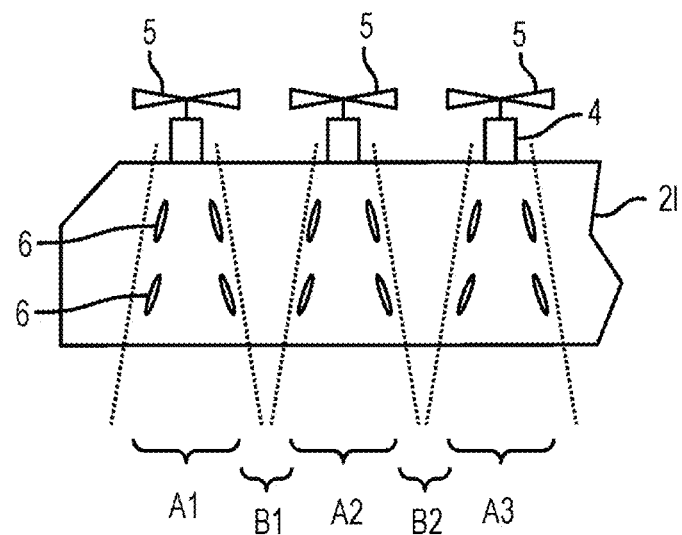
FIG. 9 shows in a top-down view a sketch of a section of an aircraft's left wing in a top-down view according to a fourth embodiment.

FIG. 9 shows a top-down view of a section of the aircraft's left wing 2*l* of the aircraft 1 according to a fourth embodiment. At least the shown vortex generators 6 of areas A1 to A3 are angled with respect to the axial direction of the propeller slipstream. When extended, they widen the propeller slipstream which then covers an increased area of the wing 2*l*. This advantageously minimizes the risk of stall in the area that would otherwise not experience any propeller slipstream.

Figure 10:
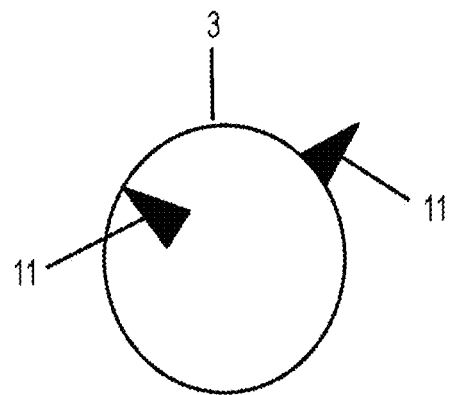
FIG. 10 shows a cross-sectional front view of a fuselage or fairing of an aircraft with an asymmetric distribution of retracted and extended vortex generators.

Different actuation of the vortex generators is not limited to vortex generators 6, 7 positioned at lifting surfaces, such as the wings 2l, 2r or horizontal elevators of the tail 9, but can also, e.g., be applied to vortex generators 11 at surfaces of the fuselage 3 or fairing, as shown in FIG. 10 with a retracted vortex generator 11 on the left side and an extended vortex generator 11 on the right side. The same applies to vortex generators 8.

The actuation of at least one of the vortex generators 6, 7, 8 and/or 11 may be dependent on at least one of the parameters out of the following group of parameters:
- a flight mode/phase and/or maneuverer of the aircraft 1;
- an air speed of the aircraft 1;
- a roll angle of the aircraft 1;
- a sideslip angle of the aircraft 1;
- an angle of attack of the aircraft 1;
- a throttle setting of at least one propulsion unit 4;
- a propeller rotation rate (RPM) of at least one propulsion unit 4;
- a propeller rotation direction of at least one propulsion unit 4;
- a propeller blade pitch angle of at least one propulsion unit 4;
- an input power supplied to at least one propulsion unit 4;
- a degree of deflection of at least one control surface 16, 17;
- a control command from a pilot or flight computer, but are not limited to or restricted by these parameters. In an embodiment, the actuation may be governed by a logic or scheme in which at least some, possibly all, of the parameter, and possibly other factors of influence like a position of a vortex generator on the aircraft, are assigned a unique weight and/or hierarchy determining its influence on the actuation of at least one vortex generator, possibly on the actuation of at least one subgroup or all vortex generators.

Of course, the invention is not restricted to the described embodiments.

For example, the number, positional arrangement, and orientation of the vortex generators is generally not limited. Particularly, any of the vortex generators 6 shown in the above figures may be present on the same wing 2l, 2r. For example, any of the areas A1 to A5 and/or B1 to B4 may comprise one or more rows of vortex generators 6 with none, one or more of the vortex generators 6 being angled with respect to the direction of the propeller slipstream. If there are angled vortex generators 6, they may be actuated independently from non-angled vortex generators 6, and vice-versa, etc.

LIST OF REFERENCE SIGNS

1 Aircraft
2l Left wing
2r Right wing
3 Fuselage
4 Propeller propulsion unit
5 Propeller
6 Vortex generator
7 Vortex generator
8 Vortex generator
9 Tail
11 Vortex generator
12 Electric motor
13 Cable
14 Lever
15 Barrel
16 Trailing edge control surface
17 Trailing edge control surface
A1-A5 Areas of the upper surface of the wing behind respective propellers
B1-B4 Areas of the upper surface of the wing between the propellers

The invention claimed is:

1. A fixed-wing aircraft, at least comprising
at least one vortex generator movable through an outer surface of the aircraft between a retracted state and a fully extended state by at least one electric motor, the at least one electric motor being exclusively adapted to actuate the at least one vortex generator, and comprising
an electronic control unit adapted to control operation of the at least one electric motor for actuation of the at least one vortex generator,
wherein the aircraft comprises multiple vortex generators on each wing,
wherein multiple propeller propulsion units are attached at each wing, sets of at least one vortex generator each are positioned on the wings behind at least two propellers, and the vortex generators of a set located in a given propeller slipstream are actuatable differently from sets located in different propeller slipstreams.

2. The aircraft according to claim 1, wherein at least one vortex generator out of the multiple vortex generators is individually actuatable.

3. The aircraft according to claim 1, wherein at least one set of at least two vortex generators, each out of these multiple vortex generators is actuatable in a similar manner.

4. The aircraft according to claim 1, wherein the vortex generators of one wing are actuatable independently from the vortex generators of the other wing.

5. The aircraft according to claim 1, wherein at least two vortex generators of one wing are actuatable independently from each other.

6. The aircraft according claim 1, wherein an alignment of at least one vortex generator of at least one set of vortex generators positioned behind a propeller is offset with respect to a flow direction of a propeller slipstream generated by the propeller in front.

7. The aircraft according to claim 1, comprising at least one set of at least one vortex generator each positioned on the wings next to the propellers, wherein the vortex generators of the sets are actuatable differently to the vortex generators of sets positioned behind the propellers.

8. The aircraft according to claim 1, comprising at least three propeller propulsion units per wing.

9. The aircraft according to claim 1, wherein the actuation of at least one vortex generator is dependent on at least one of the parameters out of the following group of parameters:
- a flight mode and/or a manoeuvre of the aircraft;
- a velocity of the aircraft;
- a roll angle and/or roll rate of the aircraft;
- a sideslip angle of the aircraft;
- an angle of attack of the aircraft;
- a degree of deflection of a control surface;
- a control command from a pilot or a flight computer.

10. The aircraft according to claim 1, wherein the actuation of at least one vortex generator is dependent on at least one operation parameter of at least one propulsion unit.

11. The aircraft according to claim 10, wherein the at least one operation parameter comprises at least one operation parameter out of the following group of operation parameters:
- a throttle setting;
- a propeller rotation rate;

a propeller rotation direction;
a propeller blade pitch angle;
an input power supplied to a propulsion unit.

12. A method for operating a fixed-wing aircraft comprising at least one vortex generator movable through an outer surface of the aircraft between a retracted state and a fully extended state by at least one electric motor, the at least one electric motor being exclusively adapted to actuate the at least one vortex generator, and comprising an electronic control unit adapted to control operation of the at least one electric motor for actuation of the at least one vortex generator, wherein the aircraft comprises multiple vortex generators on each wing, wherein multiple propeller propulsion units are attached at each wing, sets of at least one vortex generator each are positioned on the wings behind at least two propellers, and the vortex generators of a set located in a given propeller slipstream are actuatable differently from sets located in different propeller slipstreams,
   wherein the multiple vortex generators are directly actuatable between a retracted state and a fully extended state by at least one electric motor, and
   wherein the at least one electric motor is controlled exclusively for selective actuation of at least one of the multiple vortex generators.

13. A fixed-wing aircraft, at least comprising
at least one vortex generator movable through an outer surface of the aircraft between a retracted state and a fully extended state by at least one electric motor, the at least one electric motor being exclusively adapted to actuate the at least one vortex generator, and comprising
an electronic control unit adapted to control operation of the at least one electric motor for actuation of the at least one vortex generator,
wherein an alignment of at least one vortex generator of at least one set of vortex generators positioned behind a propeller is offset with respect to a flow direction of a propeller slipstream generated by the propeller in front.

14. A fixed-wing aircraft, at least comprising
at least one vortex generator movable through an outer surface of the aircraft between a retracted state and a fully extended state by at least one electric motor, the at least one electric motor being exclusively adapted to actuate the at least one vortex generator, and comprising
an electronic control unit adapted to control operation of the at least one electric motor for actuation of the at least one vortex generator,
wherein the actuation of at least one vortex generator is dependent on at least one operation parameter of at least one propulsion unit.

15. The aircraft according to claim 14, wherein the at least one operation parameter comprises at least one operation parameter out of the following group of operation parameters:
   a throttle setting;
   a propeller rotation rate;
   a propeller rotation direction;
   a propeller blade pitch angle;
   an input power supplied to a propulsion unit.

* * * * *